United States Patent
Sun

(10) Patent No.: US 9,845,842 B2
(45) Date of Patent: Dec. 19, 2017

(54) TRACTION DRIVE SYNCHRONOUS GOVERNOR AND MULTI-AXIS DRIVE GEARBOX WITH THE SAME

(71) Applicant: Chen-Tai Sun, Taipei (TW)

(72) Inventor: Chen-Tai Sun, Taipei (TW)

( * ) Notice: Subject to any disclaimer, the term of this patent is extended or adjusted under 35 U.S.C. 154(b) by 0 days.

(21) Appl. No.: 15/314,849

(22) PCT Filed: Jun. 10, 2014

(86) PCT No.: PCT/CN2014/079579
§ 371 (c)(1),
(2) Date: Nov. 29, 2016

(87) PCT Pub. No.: WO2015/188312
PCT Pub. Date: Dec. 17, 2015

(65) Prior Publication Data
US 2017/0122412 A1 May 4, 2017

(51) Int. Cl.
*F16H 13/06* (2006.01)
*F16H 3/12* (2006.01)
*F16D 23/04* (2006.01)
*F16H 3/00* (2006.01)
*F16H 3/091* (2006.01)
*F16H 37/08* (2006.01)

(52) U.S. Cl.
CPC ............... *F16H 3/12* (2013.01); *F16D 23/04* (2013.01); *F16H 3/006* (2013.01); *F16H 3/091* (2013.01); *F16H 13/06* (2013.01); *F16H 37/0806* (2013.01)

(58) Field of Classification Search
CPC ....................................................... F16H 13/06
See application file for complete search history.

(56) References Cited

U.S. PATENT DOCUMENTS

2013/0068068 A1* 3/2013 Witt ..................... F16H 37/0833
74/661
2013/0072337 A1* 3/2013 Lee ........................... B60K 6/40
475/5

(Continued)

FOREIGN PATENT DOCUMENTS

CN 1108362 A 9/1995
CN 1161419 A 10/1997

(Continued)

*Primary Examiner* — Derek D Knight
(74) *Attorney, Agent, or Firm* — C. G. Mersereau; Nikolai & Mersereau, P.A.

(57) ABSTRACT

The present invention is related to a traction drive synchronous governor and a multi-axis drive gearbox with the same, and includes a governor chamber and a speed change gear chamber. The present invention uses the synchronous governor that is deposited in the governor chamber to transmit the power of engine to an output set of the gearbox. The governor has multiple wheel assemblies between an input element and an output element in a planetary arrangement. The wheel assemblies are pushed by the output element to axially move to abut the input element to provide a power transmitting effect. At the same time, the shaft of each drive set in the speed change gear chamber is arranged in parallel at unequally spaced intervals and are surrounded by the output shaft as a center, and this may increase the number of gears of the gearbox in a limited space.

12 Claims, 11 Drawing Sheets

(56) References Cited

U.S. PATENT DOCUMENTS

| | | | | |
|---|---|---|---|---|
| 2016/0052381 A1* | 2/2016 | Kaltenbach | ............ | B60K 6/365 |
| | | | | 180/65.23 |
| 2016/0084351 A1* | 3/2016 | Lee | ......................... | F16H 3/093 |
| | | | | 74/330 |
| 2017/0015304 A1* | 1/2017 | Bjorkman | ............. | F16H 37/046 |

FOREIGN PATENT DOCUMENTS

| | | | |
|---|---|---|---|
| CN | 1178294 | A | 4/1998 |
| CN | 1495374 | A | 5/2004 |
| CN | 101082364 | A | 12/2007 |
| DE | 4135487 | A1 | 4/1993 |

\* cited by examiner

TRACTION DRIVE SYNCHRONOUS GOVERNOR AND MULTI-AXIS DRIVE GEARBOX WITH THE SAME

BACKGROUND OF THE INVENTION

1. Field of the Invention

The present invention relates to a gearbox, and more particularly to a vehicle gearbox that uses a traction drive synchronous governor and is driven by multiple axes, may improve the transmission efficiency, may reduce the wear condition, and may increase the gear number of the gearbox.

2. Description of Related Art

A conventional vehicle speed change device mainly includes several types such as manual gearshift, double-clutch automatic-manual gearshift, automatic gearshift or stepless gearshift. The structure of the manual gearshift is simple, but the clutch and the gear lever of the manual gearshift are required to be operated frequently, and wear may occur to the clutch plate of the clutch due to frequent or improper operations of the clutch. With respect to the double-clutch automatic-manual gearshift, double clutches and a computer-controlled hydraulic system are deposited in the double-clutch automatic-manual gearshift to provide an automatic gearshift function. The structure of the double-clutch automatic-manual gearshift is complex and is not easy to repair, and wear may also occur to the clutch plate.

The structure of the automatic gearshift is complex and by using a hydraulic torque converter is a non-direct driven. Additionally, the inertia resistance of the planetary gear set may result in poor transmission efficiency. The stepless gearshift is driven by friction between steel belts or rollers. When using the steel belts to drive, the stepless gearshift is limited by the structural strength of the steel belts and only can be used for small vehicles. As for using the rollers to drive, a roller controlling mechanism is very complex and is difficult to maintain. Therefore, the types of the conventional speed change device have some defects, for example, parts of the structure are prone to wear, the structure is complex, and efficiency is poor.

At the same time, regarding energy saving and carbon emission reduction for the environmental protection, the conventional speed change device is to enhance the engine power efficiency by increasing the gear number of the speed change device to ensure the appropriate power output of the engine. However, it is bound to increase the length of the driving shaft to configure the increased transmission gears when intending to increase the gear number of the speed change device, and this will enlarge the size of the speed change device, but the space of the vehicle for speed change device is limited, so how to increase the gear number of the speed change device under the limited space should be solved.

To overcome the shortcomings, the present invention provides a traction drive synchronous governor and a multi-axis drive gearbox with the same to mitigate or obviate the aforementioned problems.

SUMMARY OF THE INVENTION

The main objective of the present invention is to provide a vehicle gearbox that uses a traction drive synchronous governor and is driven by multiple axes, and may improve the transmission efficiency, may reduce the wear condition, and may increase the gear number of the gearbox.

The present invention is related to a traction drive synchronous governor and a multi-axis drive gearbox with the same, and the traction drive synchronous governor has a governor chamber and a speed change gear chamber. The present invention uses the synchronous governor that is deposited in the governor chamber to transmit the poser of engine to an output set of the gearbox. The governor has multiple wheel assemblies between an input element and an output element in a planetary arrangement. The wheel assemblies are pushed by the output element to axially move to abut the input element to provide a power transmitting effect. At the same time, the shafts of the drive sets in the speed change gear chamber are arranged in parallel at unequally spaced intervals and are surrounded by the output shaft as a center, and this may increase the number of gears of the gearbox in a limited space.

Other objectives, advantages and novel features of the invention will become more apparent from the following detailed description when taken in conjunction with the accompanying drawings.

DETAILED DESCRIPTION OF PREFERRED EMBODIMENT

The present invention will be described in further detail with reference to the accompanying drawings and the preferred embodiments of the present invention, in order to achieve the object of the invention.

Figure 1:
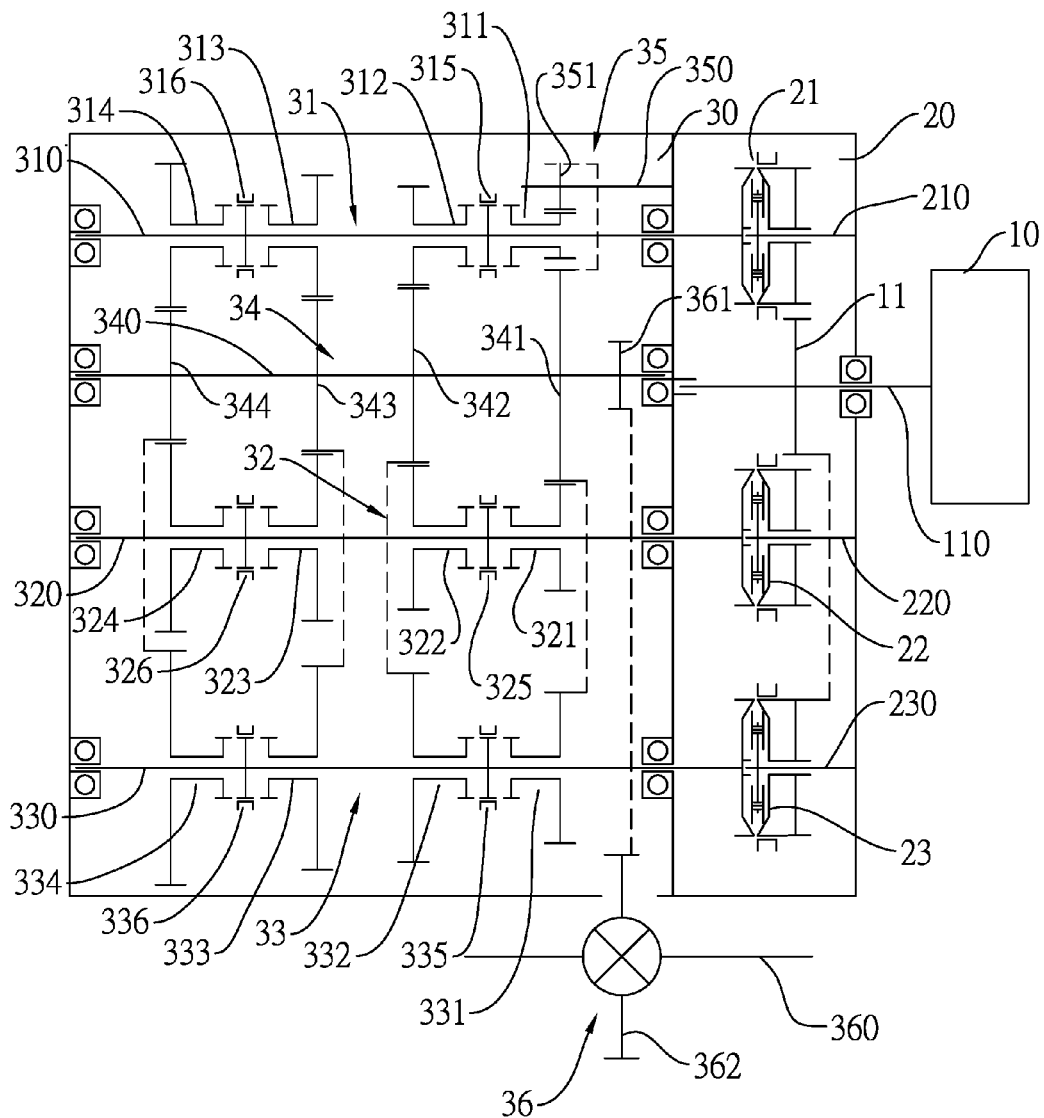
FIG. 1 is a schematic view of a multi-axis drive gearbox in accordance with the present invention, deposited in a transversally-disposed engine.

With reference to FIG. 1, a multi-axis drive gearbox with a traction drive synchronous governor is deposited in a transversal engine, and the gearbox has a governor chamber 20 and a speed change gear chamber 30.

With reference to FIG. 1, an end of the governor chamber 20 is deposited adjacent to an engine 10, and the governor chamber 20 has a drive gear 11 connected to an engine output axis 110 of the engine 10, a first governor 21, a second governor 22, and a third governor 23. The drive gear 11 engages with the first governor 21, the second governor 22, and the third governor 23 at the same time. The first governor 21 has a first axis 210, and the first axis 210 is securely deposited on an inner wall of the governor chamber 20. The second governor 22 has a second axis 220, and the third governor 23 has a third axis 230. The detailed constructions of the first governor 21, the second governor 22, and the third governor are described in detail later. The first axis 210, the second axis 220, and the third axis 230 are arranged in parallel at equally spaced intervals. The power of the engine 10 is transferred to the first governor 21, the second governor 22, and the third governor 23 via the drive gear 11. The marked dotted line between the drive gear 11 and the third governor 23 in FIG. 1 is used to indicate an engagement between the drive gear 11 and the third governor 23. The requirement of the number of governors is at least two, illustrated as three governors in the first embodiment.

With reference to FIG. 1, the speed change gear chamber 30 has a first drive set 31, a second drive set 32, a third drive set 33, an output set 34, a reverse idler set 35, and a differential 36. The speed change gear chamber 30 is connected to the other end of the governor chamber 20 that is opposite the engine 10. The number of the drive sets corresponds to the number of the governors, illustrated as three drive sets in the first embodiment.

Figure 2:
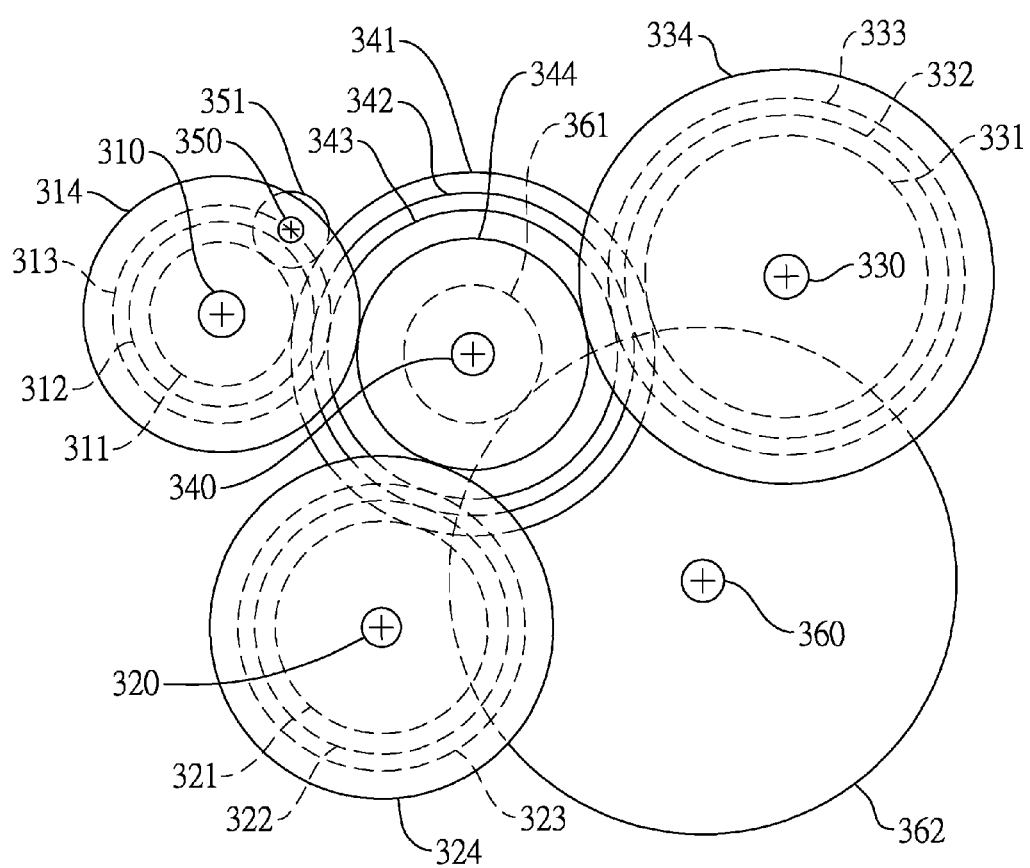
FIG. 2 is a schematic view of gear wheels of the multi-axis drive gearbox in FIG. 1.

With reference to FIGS. 1 and 2, the first drive set 31 has a first drive shaft 310, a reverse gear 311, a third gear 312, a sixth gear 313, a ninth gear 314, a first synchronizer 315, and a second synchronizer 316. The first drive shaft 310 is deposited in the speed change gear chamber 30 between bearings that are deposited at a front end and a rear end of the speed change gear chamber 30, and has an end extending into the governor chamber 20. The reverse gear 311, the third gear 312, the sixth gear 313, and the ninth gear 314 are sequentially disposed on the first drive shaft 310 from the front end of the speed change gear chamber 30. The first synchronizer 315 is deposited between the reverse gear 311 and the third gear 312. The second synchronizer 316 is deposited between the sixth gear 313 and the ninth gear 314. The canine sides of the reverse gear 311 and the third gear 312 are towards the first synchronizer 315, and the canine sides of the sixth gear 313 and the ninth gear 314 are towards the second synchronizer 316. Each one of the above-mentioned synchronizers has a tooth sleeve 3151, 3161. The numbers of gears and synchronizers required for the drive set is at least three and at least two, respectively, illustrated as four gears and two synchronizers in the first embodiment.

With reference to FIGS. 1 and 2, the structures of the second drive set 32 and the third drive set 33 are substantially the same as the structure of the first drive set 31 except for the following features. The gears and synchronizers deposited on the second drive shaft 320 are a first gear 321, a third synchronizer 325, a fourth gear 322, a seventh gear 323, a fourth synchronizer 326, and a tenth gear 324, and the gears and synchronizers deposited on the third drive shaft 330 are a second gear 331, a fifth synchronizer 335, a fifth gear 332, an eighth gear 333, a sixth synchronizer 336, and an eleventh gear 334. The first drive shaft 310, the second drive shaft 320, and the third drive shaft 330 align with the first axis 210, the second axis 220, and the third axis 230 of the governor chamber 20, respectively, and are connected to the first governor 21, the second governor 22, and the third governor 23, respectively.

With reference to FIGS. 1 and 2, the output set 34 has an output shaft 340, a first gear wheel 341, a second gear wheel 342, a third gear wheel 343, and a fourth gear wheel 344. The output shaft 340 is deposited in the speed change gear chamber 30 between bearings that are deposited at the front end and the rear end of the speed change gear chamber 30. The first gear wheel 341, the second gear wheel 342, the third gear wheel 343, and the fourth gear wheel 344 are sequentially disposed on the output shaft 340 from the front end of the speed change gear chamber 30. The first gear wheel 341 engages with the first gear 321 and the second gear 331 at the same time. The second gear wheel 342 engages with the third gear 312, the fourth gear 322, and the fifth gear 332 at the same time. The third gear wheel 343 engages with the sixth gear 313, the seventh gear 323, and the eighth gear 333 at the same time. The fourth gear wheel 344 engages with the ninth gear 314, the tenth gear 324, and the eleventh gear 334 at the same time. The first drive shaft 310, the second drive shaft 320, and the third drive shaft 330 are arranged in parallel at unequally spaced intervals and are surrounded by the output shaft 340 as a center. The marked dotted line between the output set 34 and the third drive set 33 in FIG. 1 is used to indicate an engagement between the gears and the gear wheels. The requirement of the number of gear wheels is at least three, illustrated as four governors in the first embodiment.

With reference to FIGS. 1 and 2, the reverse idler set 35 has an idler wheel shaft 350 and an idler wheel 351. An end of the idler wheel shaft 350 is securely deposited on an inner wall of the speed change gear chamber 30. The idler wheel 351 is deposited on the idler wheel shaft 350 and engages with the reverse gear 311 of the first drive set 31 and the first gear wheel 341 of the output set 34 at the same time. The idler wheel shaft 350 is parallel with the output shaft 340. The marked dotted line between the idler wheel 351 and the first gear wheel 341 in FIG. 1 is used to indicate an engagement between the idler wheel 351 and the first gear wheel 341.

With reference to FIGS. 1 and 2, the differential 36 has a driving gear wheel 361 and a driven gear wheel 362. The driving gear wheel 361 is deposited on the output shaft 340 of the output set 34 of the speed change gear chamber 30. The driven gear wheel 362 is deposited on a wheel axle 360 that is deposited out of the gearbox. The driving gear wheel 361 engages with the driven gear wheel 362. The wheel axle 360 is parallel with the output shaft 340. The marked dotted line between the driving gear wheel 361 and the driven gear wheel 362 in FIG. 1 is used to indicate an engagement between the driving gear wheel 361 and the driven gear wheel 362.

Figure 3:
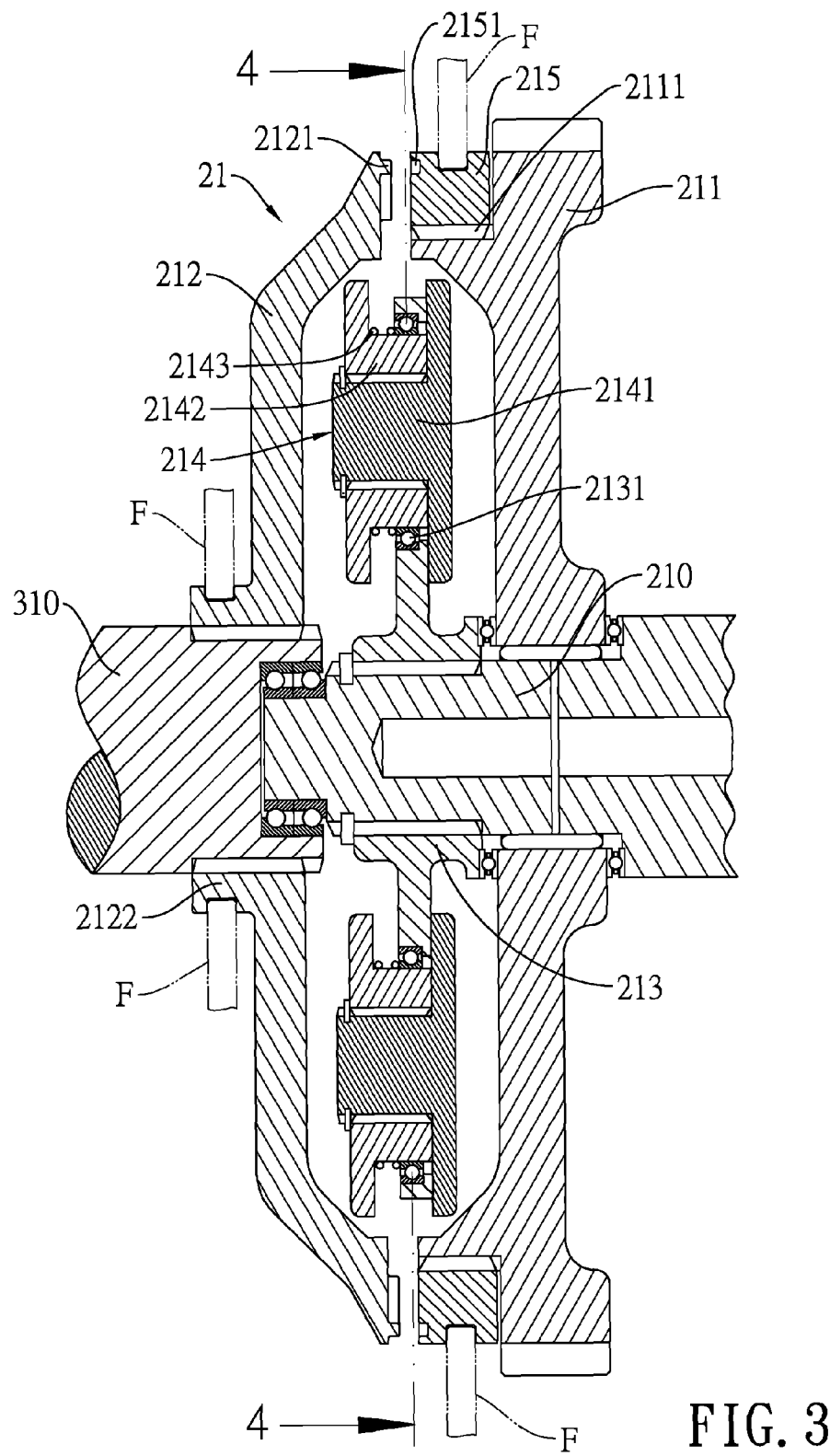
FIG. 3 is an enlarged side view in partial section of the multi-axis drive gearbox in accordance with the present invention.
Figure 4:
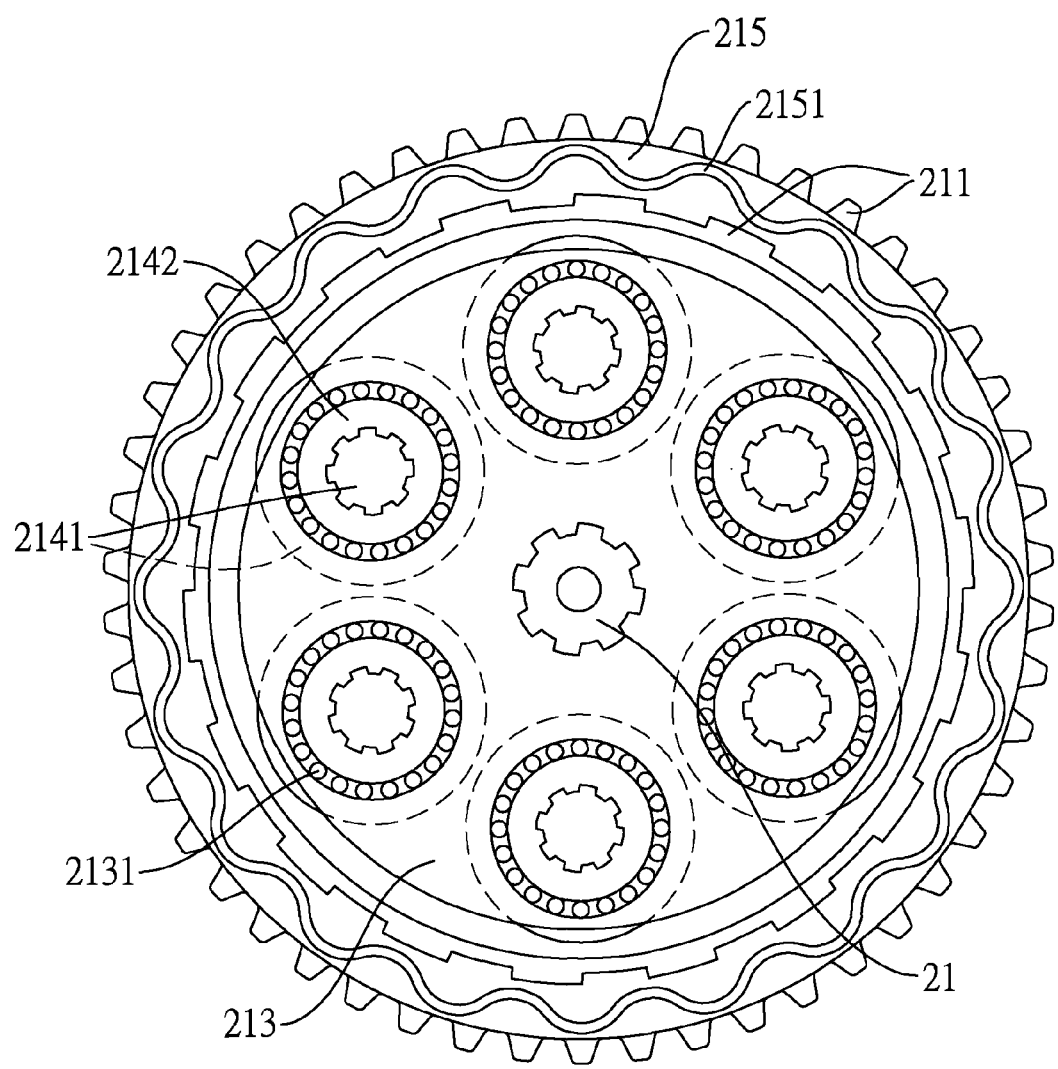
FIG. 4 is a side view in partial section of the multi-axis drive gearbox in FIG. 3 along line 4-4.

With reference to FIGS. 3 and 4, the first governor 21 has an input element 211, an output element 212, a holder 213, six wheel assemblies 214, and a tooth sleeve 215. The requirement of the number of the wheel assembly is at least three, illustrated as six wheel assemblies in the first embodiment.

The input element 211 is a gearwheel, a through hole is formed through a center of the gearwheel, a recess is formed in a side of the gearwheel, and an inclined face is formed at a connecting position between the recess and the side of the gearwheel. The gearwheel has a ring seat 2111 formed in an annular wall of the gearwheel adjacent to the recess and facing the recess. The input element 211 is deposited on the first axis 210 via the through hole. The input element 211 engages with the drive gear 11. The input element 211 of the first governor 21 is rotated by the power of the engine 10 transported via the drive gear 11.

With reference to FIGS. 3 and 4, the tooth sleeve 215 is a hollow ring body, and the ring body has a tooth recess 2151 formed in a side of the ring body. The tooth recess 2151 is in a continuous wave shape, and the crests and troughs of the wave have equal radiuses. The tooth sleeve 215 has a recess formed in an outer wall of the tooth sleeve 215. The tooth sleeve 215 has a tooth trough formed in an inner wall of the tooth sleeve 215. The inner wall of the tooth sleeve 215 is mounted around the protruding teeth that are deposited on the annular wall of the ring seat 2111 of the input element 211. A fork F is mounted in the recess that is disposed in the outer wall of the tooth sleeve 215 to press against the tooth sleeve 215 to move axially relative to the input element 211.

With reference to FIG. 3, the output element 212 is a disc body, the disc body has a through hole formed through a center of the disc body, a recess is formed in a side of the disc body, and an inclined face is formed at a connecting position between the recess and the side of the disc body. The disc body has a protruding tooth 2121 formed on and protruding from the side that is adjacent to the recess of the disc body. The protruding tooth 2121 is in a continuous wave shape, and the crests and troughs of the wave have equal radiuses. A connecting position between a side wall and an edge face of the protruding tooth 2121 is round. The disc body has a mounting segment 2122 formed on and protruding from a side adjacent to the through hole and opposite the recess of the disc body. The mounting segment 2122 forms a groove. The output element 212 is mounted around the protruding teeth that are formed on the annular wall of the first drive shaft 310 via a tooth trough formed in the through hole and the inner wall of the groove of the output element 212. The protruding tooth 2121 of the output element 212 corresponds to the tooth recess 2151 of the tooth sleeve 215. A fork F is mounted in the recess that is disposed in the mounting segment 2122 to press against the output element 212 to move axially relative to the first drive shaft 310.

With reference to FIGS. 3 and 4, the holder 213 is a disk body, and the disk body has a through hole formed through a center of the disk body and six communicating holes formed through the disk body and planetarily surrounding the through hole of the disk body. A bearing 2131 is mounted in each one of the communicating holes, and the number of the communicating holes of the holder 213 corresponds to the number of the wheel assemblies 214, illustrated as six communicating holes in the first embodiment.

With reference to FIGS. 3 and 4, each one of the wheel assemblies 214 has a first tray 2141, a second tray 2142, and a spring 2143. The first tray 2141 is round and has a cylinder formed on and protruding from a center of the first tray 2141. The second tray 2142 is round, and has a cylinder formed on and protruding from a center of the second tray 2142 and a penetrating hole formed through the cylinder. The spring 2143 is mounted around an outer wall of the cylinder of the second tray 2142, and the second tray 2142 is deposited in the bearing 2131 of the holder 213. The cylinder of the first tray 2141 extends through the penetrating hole of the cylinder of the second tray 2142 and is securely connected to the second tray 2142. The tension of the spring 2143 enables the second tray 2142 to move away from a side of the holder 213, and the first tray 2141 abuts the other side of the holder 213.

Figure 5:
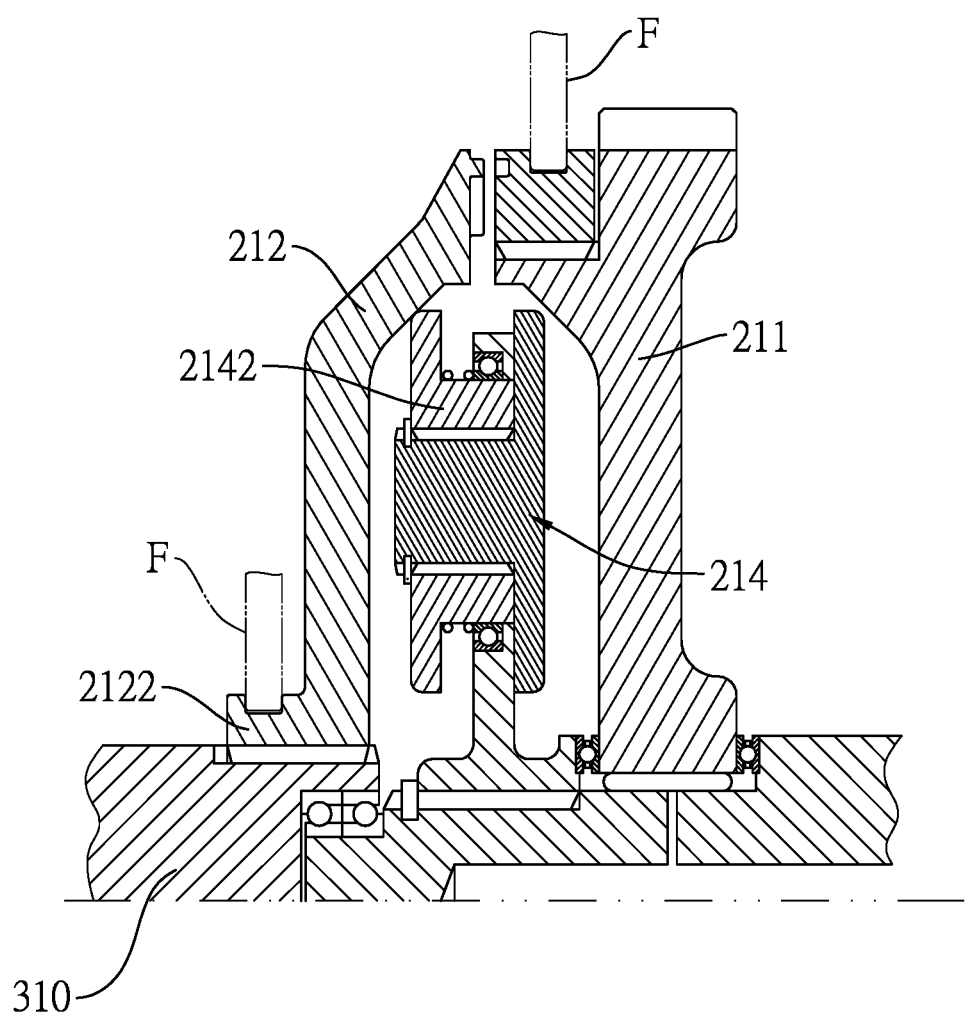
FIG. 5 is an enlarged and operational side view in partial section of the multi-axis drive gearbox in FIG. 1, under a first condition.
Figure 6:
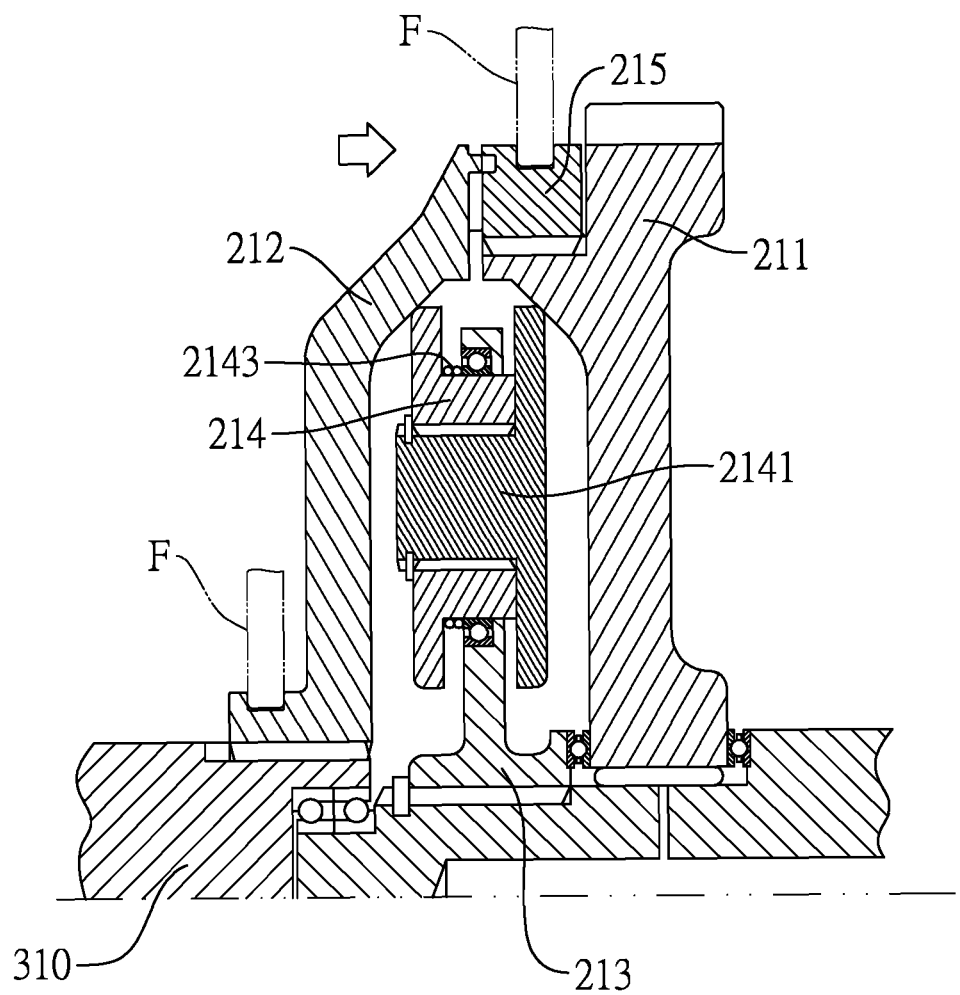
FIG. 6 is an enlarged and operational side view in partial section of the multi-axis drive gearbox in FIG. 1, under a second condition.
Figure 7:
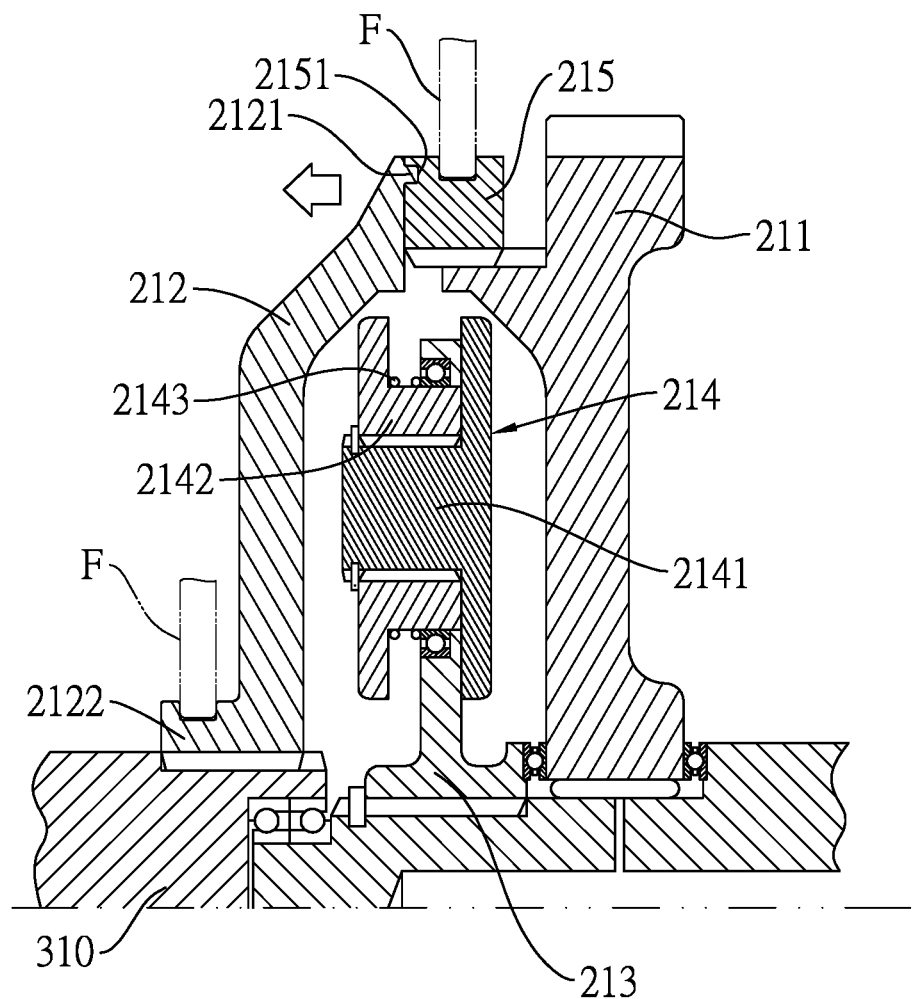
FIG. 7 is an enlarged and operational side view in partial section of the multi-axis drive gearbox in FIG. 1, under a third condition.

With reference to FIGS. 5 to 7, as the internal structure of the first governor 21 is symmetrical, only an upper half of the internal structure is described. With reference to FIGS. 5 and 6, when the output element 212 is pushed by the fork F, the output element 212 is axially moved toward the input element 211 along the first drive shaft 310. The inclined face of the recess of the output element 212 presses against the second tray 2412 of the wheel assembly 214, and this enables the second tray 2142 to move toward the input element 211 relative to the holder 213 and enables the second tray 2142 to press and compress the spring 2143. Since the first tray 2141 is securely connected to the second tray 2142, this enables the first tray 2141 to move away from the holder 213 and to press the inclined face of the recess of the input element 211.

The rotating force of the input element 211 is pulled by the wheel assembly 214 to be transmitted to the output element 212, so that the rotating speed of the output element 212 approximates the rotating speed of the input element 211, and the first drive shaft 310 is driven to rotate.

With reference to FIG. 7, when the rotating speed of the output element 212 approximates the rotating speed of the input element 211, the tooth sleeve 215 is pushed by the fork F to move toward the output element 212, the tooth recess 2151 of the tooth sleeve 215 engages with the protruding tooth 2121 of the output element 212, and the tooth sleeve 215 is continuously pushed by the fork F to push the output element 212 to enable the output element 212 to move away from the input element 211 along the first drive shaft 310. The second tray 2142 of the wheel assembly 214 is pressed by the tension of the spring 2143 to enable the second tray 2142 to keep away from the holder 213. At the same time, the first tray 2141 remains away from the input element 211 to abut the holder 213, and this enables the power of the engine 10 to be directly transmitted to the output element 212 via the tooth sleeve 215 of the input element 211 and drives the first drive shaft 310 to rotate.

When the tooth sleeve 215 is pushed by the fork F to move away from the input element 212, the first governor 21 returns to the default separation status.

The structures of the second governor 22 and the third governor 23 are same as the structure of the first governor 21, and are not described in detail.

Figure 8:
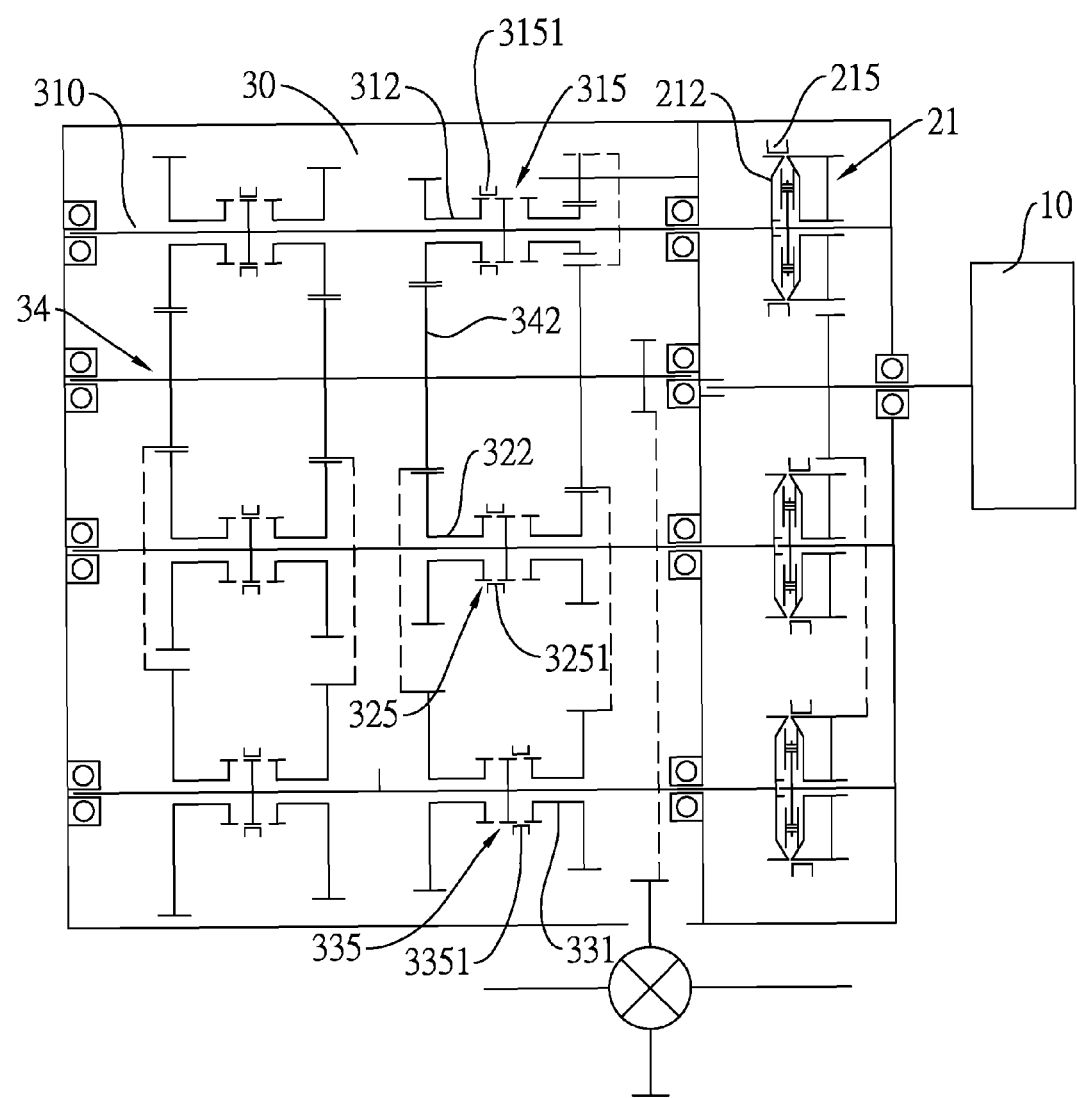
FIG. 8 is a schematic operational view of the multi-axis drive gearbox in FIG. 1, under the first condition.
Figure 9:
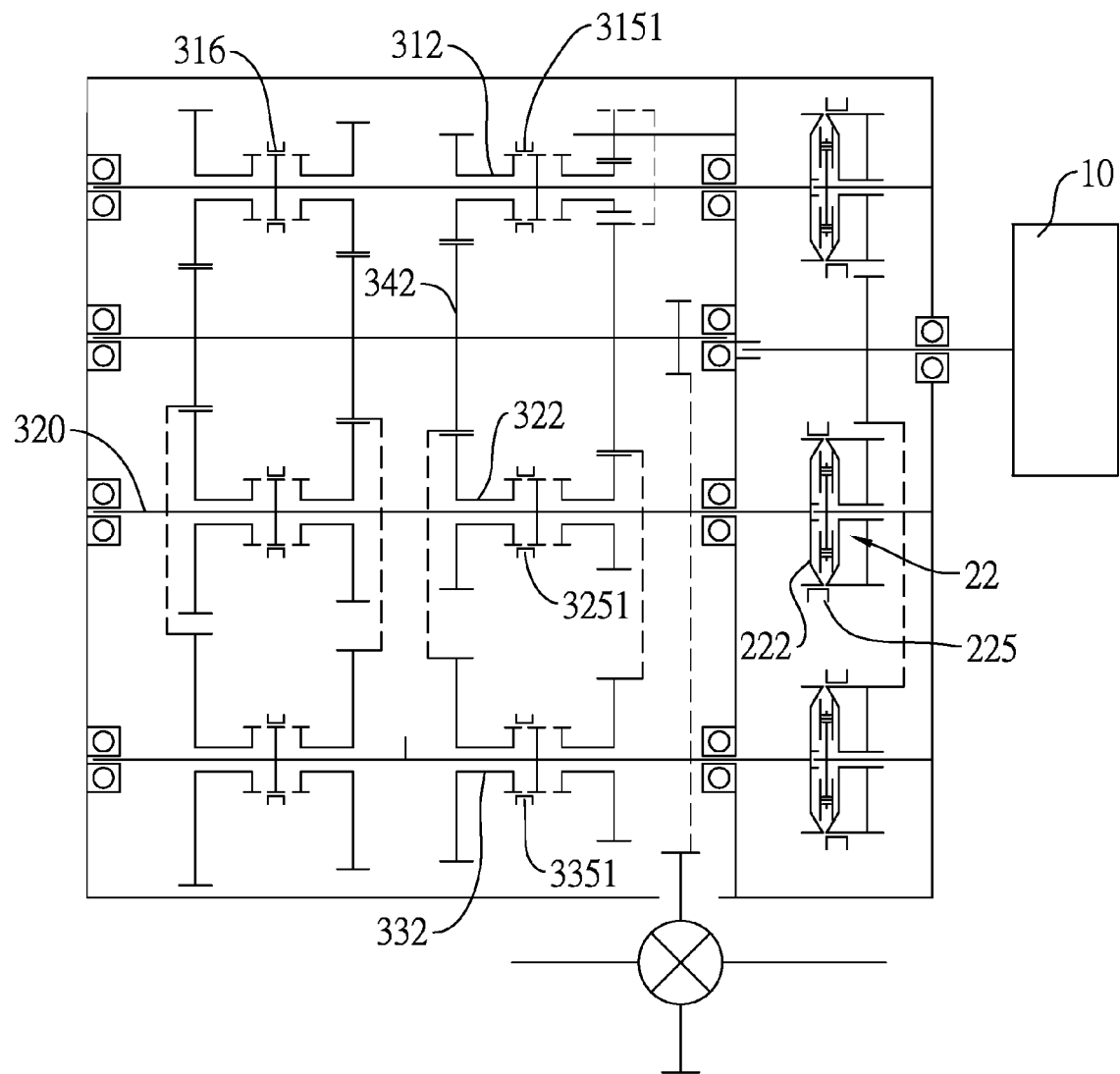
FIG. 9 is a schematic operational view of the multi-axis drive gearbox in FIG. 1, under the second condition.

With reference to FIGS. 8 and 9, when the gearbox is put into the third gear, the tooth sleeve 3351 of the fifth synchronizer 335 is pushed by the fork F to press against and engage the canine side of the second gear 331, the tooth sleeve 3151 of the first synchronizer 315 is pushed by the fork F to press against and engage the canine side of the third gear 312, the tooth sleeve 3251 of the third synchronizer 325 is pushed by the fork F to press against and engage the canine side of the fourth gear 322, and the tooth sleeve 215 of the first governor 21 engages with the output element 212, and this enables the power of the engine 10 to be transmitted to the first drive shaft 310 and further transmitted to the second gear wheel 342 of the output set 34 via the third gear 312. When the gear is put from the third gear to the fourth gear, the tooth sleeve 215 of the first governor 21 disengages from the output element 212, the tooth sleeve 3351 is pushed by the fork F to engage the canine side of the fifth gear 332, the third gear 312 remains engaged with tooth sleeve 3151, the fourth gear 322 remains engaged with tooth sleeve 3251, and the tooth sleeve 225 of the second governor 22 engages with the output element 222. Then, the power of the engine 10 is transmitted to the second drive shaft 320, and the fourth gear 322 transmits the power to the second gear wheel 342.

Figure 10:
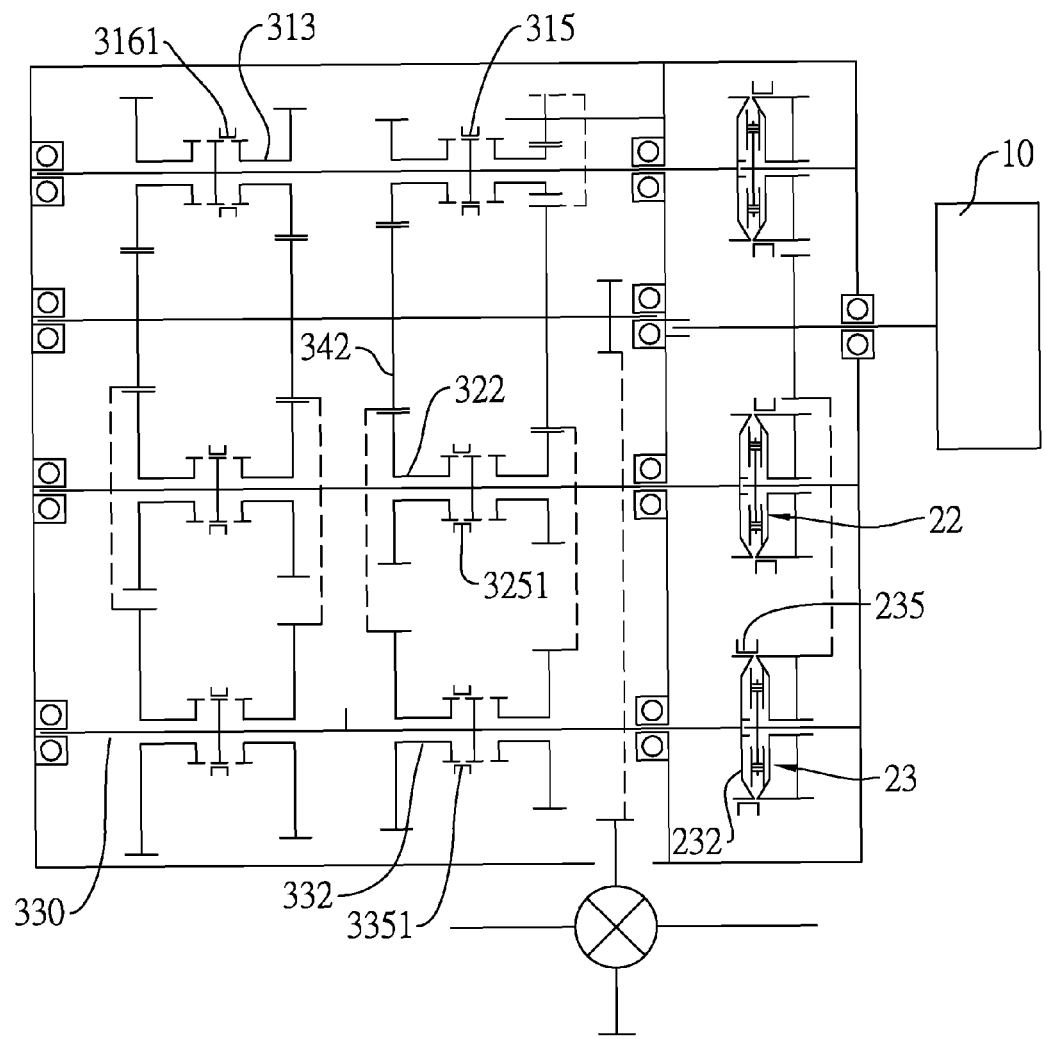
FIG. 10 is a schematic operational view of the multi-axis drive gearbox in FIG. 1, under a third condition.

With reference to FIGS. 9 and 10, when the gearbox is put into the fifth gear, the tooth sleeve 225 of the second governor 22 disengages from the output element 222, the tooth sleeve 3151 of the first synchronizer 315 is pushed by the fork F to disengage from the canine side of the third gear 312, the tooth sleeve 3161 of the second synchronizer 316 is pushed by the fork F to engage with the canine side of the sixth gear 313, the fourth gear 322 remains engaged with tooth sleeve 3251, the fifth gear 332 remains engaged with tooth sleeve 3351, and the tooth sleeve 235 of the third governor 23 engages with the output element 232. The, the power of the engine 10 is transmitted to the third drive shaft 330, and the fifth gear 332 transmits the power to the second gear wheel 342.

Figure 11:
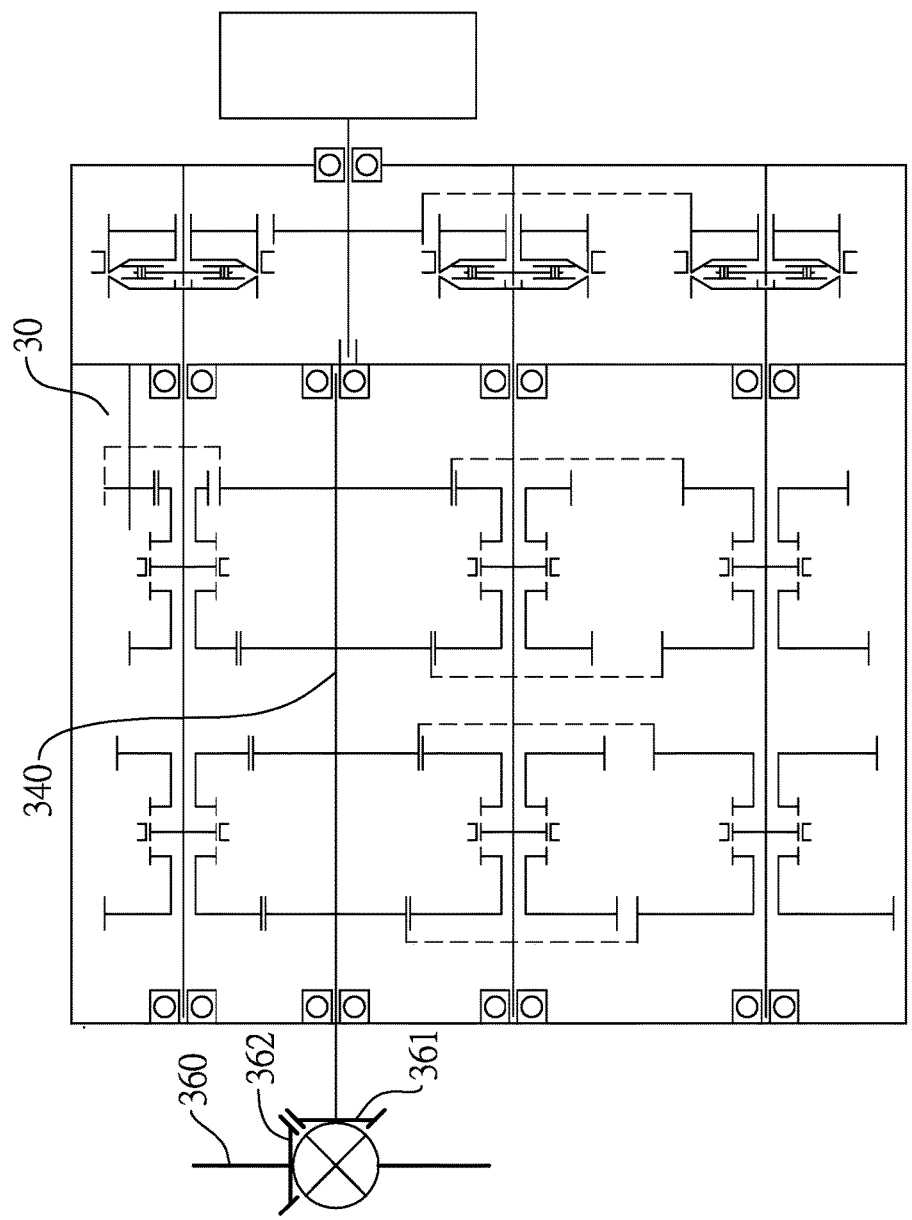
FIG. 11 is a schematic view of the multi-axis drive gearbox in FIG. 1, deposited in a longitudinal-disposed engine.

With reference to FIG. 11, the multi-axis drive gearbox with the traction drive synchronous governor of the present invention is deposited in a longitudinal-disposed engine, the output shaft 340 extends out of the speed change gear chamber 30 of the gearbox, the driving gear wheel 361 of the differential 36 is deposited on the output shaft 340 that extends out of the speed change gear chamber 30, the driven gear wheel 362 is deposited on the wheel axle 360 that is deposited out of the gearbox, the driving gear wheel 361 engages with the driven gear wheel 362, and the wheel axle 360 is vertically aligned with the output shaft 340.

When the gear of the gearbox is put into a park gear or a neutral gear, the above-mentioned governors and the synchronizers are in the default state of separation, and then the power of the engine is not output from the gearbox.

When the gear of the gearbox is put into a drive gear, the tooth sleeve 3251 of the third synchronizer 325 is in the default state of separation, is pushed forwardly by a power mechanism control fork to engage with the canine side of the first gear 321, the tooth sleeve 3351 of the fifth synchronizer 335 is in the default state of separation, is pushed forwardly by the power mechanism control fork to engage the canine side of the second gear 331, the tooth sleeve 3151 of the first synchronizer 315 is in the default state of separation, is pushed backwardly by the power mechanism control fork to engage with the canine side of the third gear 312, and the second governor 22 is engaged with the power mechanism control fork at the same time. Then, the power of the engine is transmitted into the output element 222 of the second governor 22 and the second drive shaft 320 via the engine output axis 110 and the drive gear 11 to enable the first gear 321 to drive the first gear wheel 341, and this forms a first output gear.

When the gear of the gearbox is put from the first gear into the second gear, the third governor 23 is engaged with the power mechanism control fork, and the second governor 22 is disengaged with the power mechanism control fork at the same time. Then, the power of the engine is transmitted into the output element 232 of the third governor 23 and the third drive shaft 330 via the engine output axis 110 and the drive gear 11 to enable the second gear 331 to drive the first gear wheel 341, and this forms a second output gear.

When the gear of the gearbox is put from the second gear into the third gear, the first governor 21 is engaged with the power mechanism control fork, and the third governor 23 is disengaged with the power mechanism control fork at the same time. The tooth sleeve 3251 of the third synchronizer 325 that engages with the canine side of the first gear 321 is pushed backwardly by the power mechanism control fork to disengage from the canine side of the first gear 321 and to engage with the canine side of the fourth gear 322. Then, the power of the engine is transmitted into the output element 212 of the first governor 21 and the first drive shaft 310 via the engine output axis 110 and the drive gear 11 to enable the third gear 312 to drive the second gear wheel 342, and this forms a third output gear.

When the gear of the gearbox is put from the fifth gear into the sixth gear, the first governor 21 is engaged with the power mechanism control fork, and the third governor 23 is disengaged with the power mechanism control fork at the same time. The tooth sleeve 3251 of the third synchronizer 325 that engages with the canine side of the fourth gear 322 is pushed forwardly by the power mechanism control fork to disengage from the canine side of the fourth gear 322 and return to the default state of separation. At the same time, the tooth sleeve 3261 of the fourth synchronizer 326 that is in the default state of separation is pushed forwardly to engage with the canine side of the seventh gear 323. Then, the power of the engine is transmitted into the output element 212 of the first governor 21 and the first drive shaft 310 via the engine output axis 110 and the drive gear 11 to enable the sixth gear 313 to drive the third gear wheel 343, and this forms a sixth output gear.

When the gear of the gearbox is put from the sixth gear into the seventh gear, the second governor 22 is engaged with the power mechanism control fork, and the first governor 21 is disengaged with the power mechanism control fork at the same time. The tooth sleeve 3351 of the fifth synchronizer 335 that engages with the canine side of the fifth gear 332 is pushed forwardly by the power mechanism control fork to disengage from the canine side of the fifth gear 332 and return to the default state of separation. At the same time, the tooth sleeve 3361 of the sixth synchronizer 336 that is in the default state of separation is pushed forwardly to engage with the canine side of the eighth gear 333. Then, the power of the engine is transmitted into the output element 222 of the second governor 22 and the second drive shaft 320 via the engine output axis 110 and the drive gear 11 to enable the seventh gear 323 to drive the third gear wheel 343, and this forms a seventh output gear.

When the gear of the gearbox is put from the seventh gear into the eighth gear, the third governor 23 is engaged with the power mechanism control fork, and the second governor 22 is disengaged with the power mechanism control fork at the same time. The tooth sleeve 3161 of the second synchronizer 316 that engages with the canine side of the sixth gear 313 is pushed backwardly by the power mechanism control fork to disengage from the canine side of the sixth gear 313 and to engage with the canine side of the ninth gear 314. Then, the power of the engine is transmitted into the output element 232 of the third governor 23 and the third drive shaft 330 via the engine output axis 110 and the drive gear 11 to enable the eighth gear 333 to drive the third gear wheel 343, and this forms an eighth output gear.

When the gear of the gearbox is put from the eighth gear into the ninth gear, the first governor 21 is engaged with the power mechanism control fork, and the third governor 23 is disengaged with the power mechanism control fork at the same time. The tooth sleeve 3261 of the fourth synchronizer 326 that engages with the canine side of the seventh gear 323 is pushed backwardly by the power mechanism control fork to disengage from the canine side of the seventh gear 323 and to engage with the canine side of the tenth gear 324. Then, the power of the engine is transmitted into the output element 212 of the first governor 21 and the first drive shaft 310 via the engine output axis 110 and the drive gear 11 to enable the ninth gear 314 to drive the fourth gear wheel 344, and this forms a ninth output gear.

When the gear of the gearbox is put from the ninth gear into the tenth gear, the second governor 22 is engaged with the power mechanism control fork, and the first governor 21 is disengaged with the power mechanism control fork at the same time. The tooth sleeve 3361 of the sixth synchronizer 336 that engages with the canine side of the eighth gear 333 is pushed backwardly by the power mechanism control fork to disengage from the canine side of the eighth gear 333 and to engage with the canine side of the eleventh gear 334. Then, the power of the engine is transmitted into the output element 222 of the second governor 22 and the second drive shaft 320 via the engine output axis 110 and the drive gear 11 to enable the tenth gear 324 to drive the fourth gear wheel 344, and this forms a tenth output gear.

When the gear of the gearbox is put from the tenth gear into the eleventh gear, the third governor 23 is engaged with the power mechanism control fork, and the second governor 22 is disengaged with the power mechanism control fork at the same time. Then, the power of the engine is transmitted into the output element 232 of the third governor 23 and the third drive shaft 330 via the engine output axis 110 and the drive gear 11 to enable the eleventh gear 334 to drive the fourth gear wheel 344, and this forms an eleventh output gear.

With respect to the first governor 21, a production method of the continuous wave shaped tooth recess 2151 of the tooth sleeve 215 and the continuous wave shaped protruding tooth 2121 of the output element 212 is: drawing a circular wavy line with both crests and troughs of equal radiuses, drawing two annular wavy lines after moving the circular wavy line to both sides with equidistant movement, and drawing the continuous wave shaped tooth recess 2151 and protruding tooth 2121 on the basis of the two annular wavy lines. In addition, the intersecting lines in all planes are rounded with equal radiuses.

In the first governor 21, an assembly method of the wheel assembly 214 is: the spring 2143 is mounted around the hollow cylinder of the second tray 2142.

The hollow cylinder of the second tray 2142 is mounted in the bearing 2131 that is deposited in the communicating hole of the holder 213 from the side of the holder 213 that is adjacent to the power output, and the bearing 2131 allows the hollow cylinder of the second tray 2142 to axially move forward or backward in the bearing 2131. The cylinder of the first tray 2141 is mounted in the hollow cylinder of the second tray 2142 via the other side of the holder 213, and a locking ring is deposited on the cylinder of the first tray 2141 that extends out of the hollow cylinder of the second tray 2142.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the fall extent indicated by the broad general meaning of the terms in which the appended claims are expressed.

What is claimed is:

1. A traction drive synchronous governor connecting a drive shaft and comprising:
   an axis;
   an input element being a gearwheel, and having
      a center;
      a side;
      an annular wall;
      a through hole formed through the center of the gearwheel and disposed around the axis;
      a recess formed in the side of the gearwheel;
      an inclined face formed at a connecting position between the recess and the side of the gearwheel;
      a ring seat formed in the annular wall of the gearwheel adjacent to the recess and facing the recess; and
      a protruding tooth formed on and protruding from the annular wall of the gearwheel;
   a tooth sleeve being a hollow ring body and having
      a side;
      an inner wall;
      a tooth recess being in a continuous wave shape, formed in the side of the ring body, and having crests and troughs of equal radiuses;
      a tooth trough formed in the inner wall of the tooth sleeve, disposed around the protruding tooth of the ring seat of the input element, and the tooth trough axially moving relative to the protruding tooth;
   an output element being a disc body, corresponding to the input element, and having
      a center;
      a side;
      a through hole formed through the center of the disc body;
      a recess formed in the side of the disc body;
      an inclined face formed at a connecting position between the recess and the side of the disc body;
      a protruding tooth formed on and protruding from the side that is adjacent to the recess of the disc body, being in a continuous wave shape, and corresponding to the continuous wave-shaped tooth recess of the tooth sleeve;
      a mounting segment formed on and protruding from a side adjacent to the through hole and opposite the recess of the disc body;
      a tooth trough formed in the through hole and an inner wall of a groove of the output element that is formed by the mounting segment;
   wherein the through hole and the mounting segment of the output element are connected to the drive shaft to enable the output element to axially move relative to the drive shaft;
   a holder being a disk body and having
      a center;
      a through hole formed through the center of the disk body and disposed around the axis;
      at least three communicating holes formed through the disk body and planetarily surrounding the through hole of the disk body; and
      a bearing mounted in each one of the at least three communicating holes of the disk body; and
   at least three wheel assemblies, and each one of the at least three wheel assemblies mounted in the bearing that is deposited in a corresponding one of the communicating holes of the holder.

2. The traction drive synchronous governor as claimed in claim 1, wherein each one of the at least three wheel assemblies has
   a first tray being round and having a cylinder formed on and protruding from a center of the first tray;
   a second tray being round, and having
      a cylinder formed on and protruding from a center of the second tray and deposited in the bearing that is deposited in a corresponding one of the communicating holes of the holder; and
      a penetrating hole formed through the cylinder of the second tray; and
   a spring mounted around an outer wall of the cylinder of the second tray;
   wherein the cylinder of the first tray extends through the penetrating hole of the cylinder of the second tray and is securely connected to the second tray, the spring has two ends abutting between the holder and the second tray to enable the second tray to move away from the holder, and the first tray abuts the holder.

3. A gearbox that has the traction drive synchronous governor as claimed in claim 1, wherein the gearbox has a governor chamber deposited adjacent to an engine and having
- a drive gear connected to an engine output axis of the engine; and
- at least two governors, and an end of the axis of each one of the at least two governors securely deposited on an inner wall of the governor chamber and the axes arranged in parallel at equally spaced intervals relative to the engine output axis of the engine; and wherein the drive gear engages with the input elements of the at least two governors;

a speed change gear chamber connected to an end of the governor chamber that is distal from the engine and having
- an output set having
  - an output shaft deposited in the speed change gear chamber; and
  - at least three gear wheels deposited on the output shaft of the output set;
- at least two drive sets, and each one of the at least two drive sets having
  - a shaft having a protruding tooth formed on and protruding from an annular wall of the shaft and extending in the tooth trough that is formed in the through hole and the inner wall of the groove of the output element of one of the at least two governors, the shaft mounted in the speed change gear chamber, extending into the governor chamber, and connected to one of the at least two governors;

wherein the shafts of the least two drive sets are arranged in parallel at unequally spaced intervals and are surrounded by the output shaft as a center;
- at least three gears deposited on the shaft of each one of the at least two drive sets, corresponding to and engaging with the gear wheels of the output set; and
- at least two synchronizers deposited on the shaft of each one of the at least two drive sets and in staggered arrangement with the at least three gear wheels of the output set; and
- a reverse idler set having
  - an idler wheel shaft having an end adjacent to the governor chamber, securely deposited on the inner wall of the speed change gear chamber and parallel with the output shaft; and
  - an idler wheel deposited on the idler wheel shaft and engaging with the at least three gears of the at least two drive sets and the at least three gear wheels of the output set.

4. The gearbox as claimed in claim 3, wherein
the governor chamber has three governors, respectively a first governor, a second governor, and a third governor;
the speed change gear chamber has three drive sets, respectively a first drive set, a second drive set, and a third drive set;
the axis of the first drive set is connected to the first governor, the axis of the second drive set is connected to the second governor, and the axis of the third drive set is connected to the third governor;
the output set has a first gear wheel, a second gear wheel, a third gear wheel, and a fourth gear wheel, and the gear wheels are deposited on the output shaft of the output set sequentially;
a reverse gear, the first governor, a third gear, a sixth gear, the second governor, and a ninth gear are sequentially disposed on the shaft of the first drive set;
a first gear, the third governor, a fourth gear, a seventh gear, a fourth governor, and a tenth gear are sequentially disposed on the shaft of the second drive set;
a second gear, a fifth governor, a fifth gear, an eighth gear, a sixth governor, and an eleventh gear are sequentially disposed on the shaft of the third drive set;
the first gear wheel engages with the first gear and the second gear, the second gear wheel engages with the third gear, the fourth gear, and the fifth gear, the third gear wheel engages with the sixth gear, the seventh gear, and the eighth gear, and the fourth gear wheel engages with the ninth gear, the tenth gear, and the eleventh gear; and
the idler wheel engages with the reverse gear of the first drive set and the first gear wheel of the output set.

5. The gearbox as claimed in claim 3, wherein the gearbox has
- a wheel axle deposited out of the gearbox and being parallel with the output shaft; and
- a differential having
  - a driving gear wheel deposited on the output shaft of the output set; and
  - a driven gear wheel deposited on the wheel axle, and engaging with the driving gear wheel.

6. The gearbox as claimed in claim 3, wherein the gearbox has
- a wheel axle deposited out of the gearbox and being perpendicular with the output shaft; and
- a differential having
  - a driving gear wheel deposited on the output shaft of the output set; and
  - a driven gear wheel deposited on the wheel axle, and engaging with the driving gear wheel.

7. The gearbox as claimed in claim 4, wherein
the tooth sleeve of each one of the governors has a recess formed in an outer wall of the tooth sleeve for a fork to mount in; and
the mounting segment of the output element of each one of the governors has a recess formed in the mounting segment for a fork to mount in.

8. The traction drive synchronous governor as claimed in claim 2, wherein a production method of the continuous wave-shaped tooth recess of the tooth sleeve and the continuous wave-shaped protruding tooth of the output element is:
- drawing a circular wavy line with crests and troughs of equal radiuses;
- drawing two annular wavy lines after moving the circular wavy line to both sides with equidistant movement; and
- drawing the continuous wave-shaped tooth recess and protruding tooth on the basis of the two annular wavy lines;

wherein intersecting lines in all planes of the continuous wave-shaped tooth recess of the tooth sleeve and the continuous wave-shaped protruding tooth of the output element are rounded with equal radiuses.

9. The traction drive synchronous governor as claimed in claim 2, wherein an assembly method of each one of the at least three wheel assemblies is:
- mounting the spring around the hollow cylinder of the second tray;
- mounting the hollow cylinder of the second tray in the bearing that is deposited in the communicating hole of the holder from the side of the holder that is adjacent to the power output, and the bearing allowing the hollow cylinder of the second tray to axially move forward or backward in the bearing; and mounting the cylinder of the first tray in the hollow cylinder of the second tray via the other side of the holder;

wherein a locking ring is deposited on the cylinder of the first tray that extends out of the hollow cylinder of the second tray.

10. A gearbox that has the traction drive synchronous governor as claimed in claim 2, wherein the gearbox has
a governor chamber deposited adjacent to an engine and having
a drive gear connected to an engine output axis of the engine; and
at least two governors, and an end of the axis of each one of the at least two governors securely deposited on an inner wall of the governor chamber and the axes arranged in parallel at equally spaced intervals relative to the engine output axis of the engine; and
wherein the drive gear engages with the input elements of the at least two governors;
a speed change gear chamber connected to an end of the governor chamber that is distal from the engine and having
an output set having
an output shaft deposited in the speed change gear chamber; and
at least three gear wheels deposited on the output shaft of the output set;
at least two drive sets, and each one of the at least two drive sets having
a shaft having a protruding tooth formed on and protruding from an annular wall of the shaft and extending in the tooth trough that is formed in the through hole and the inner wall of the groove of the output element of one of the at least two governors, the shaft mounted in the speed change gear chamber, extending into the governor chamber, and connected to one of the at least two governors;

wherein the shafts of the least two drive sets are arranged in parallel at unequally spaced intervals and are surrounded by the output shaft as a center;
at least three gears deposited on the shaft of each one of the at least two drive sets, corresponding to and engaging with the gear wheels of the output set; and
at least two synchronizers deposited on the shaft of each one of the at least two drive sets and in staggered arrangement with the at least three gear wheels of the output set; and
a reverse idler set having
an idler wheel shaft having an end adjacent to the governor chamber, securely deposited on the inner wall of the speed change gear chamber and parallel with the output shaft; and
an idler wheel deposited on the idler wheel shaft and engaging with the at least three gears of the at least two drive sets and the at least three gear wheels of the output set.

11. The gearbox as claimed in claim 4, wherein the gearbox has
a wheel axle deposited out of the gearbox and being parallel with the output shaft; and
a differential having
a driving gear wheel deposited on the output shaft of the output set; and
a driven gear wheel deposited on the wheel axle, and engaging with the driving gear wheel.

12. The gearbox as claimed in claim 4, wherein the gearbox has
a wheel axle deposited out of the gearbox and being perpendicular with the output shaft; and
a differential having
a driving gear wheel deposited on the output shaft of the output set; and
a driven gear wheel deposited on the wheel axle, and engaging with the driving gear wheel.

\* \* \* \* \*